Sept. 28, 1954
L. A. KILLE
2,690,299
TESTING SYSTEM
Filed Aug. 13, 1948
14 Sheets-Sheet 5
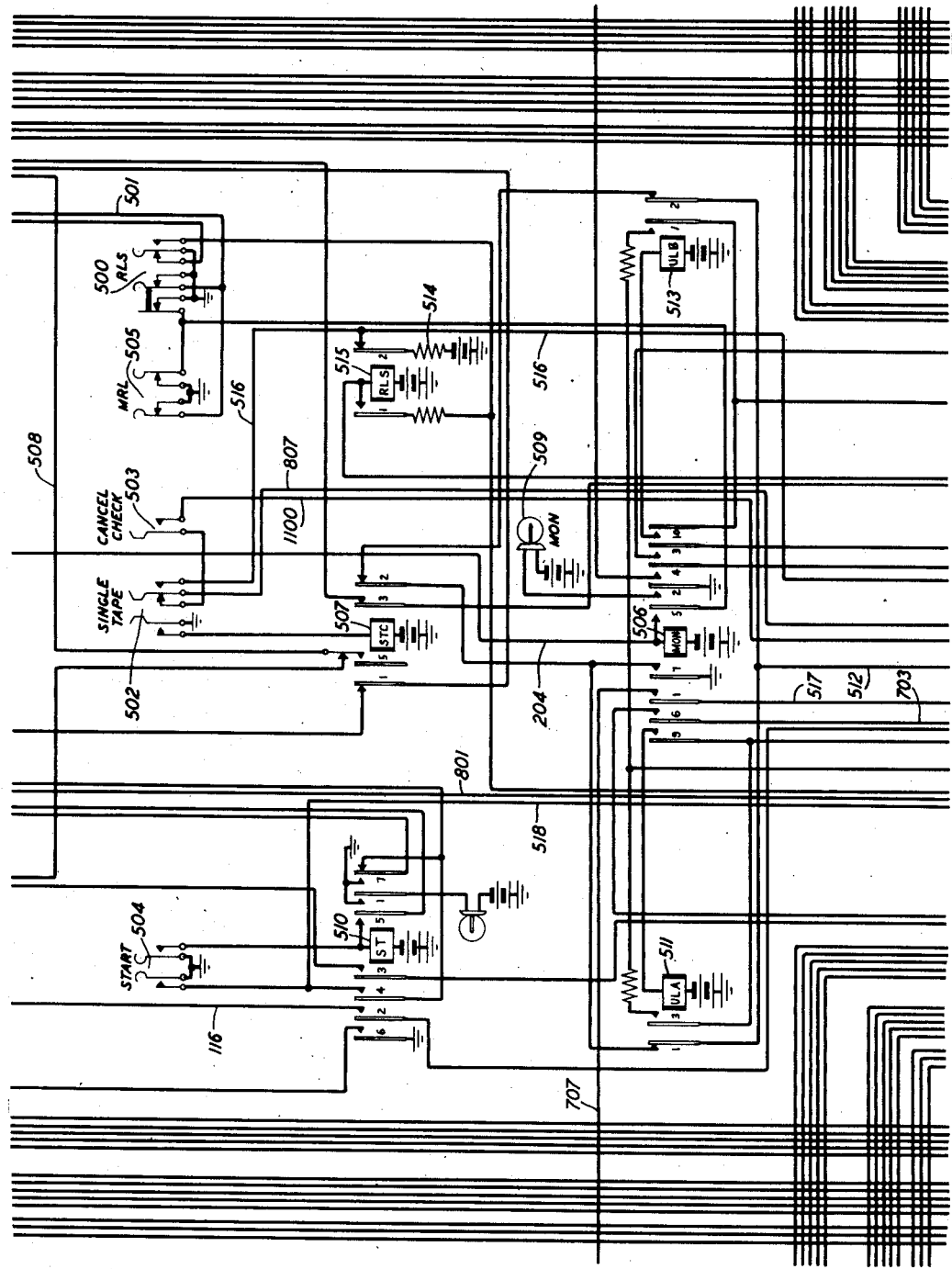
FIG. 5
INVENTOR
L. A. KILLE
BY 
ATTORNEY Sept. 28, 1954  L. A. KILLE  2,690,299
TESTING SYSTEM
Filed Aug. 13, 1948  14 Sheets-Sheet 8
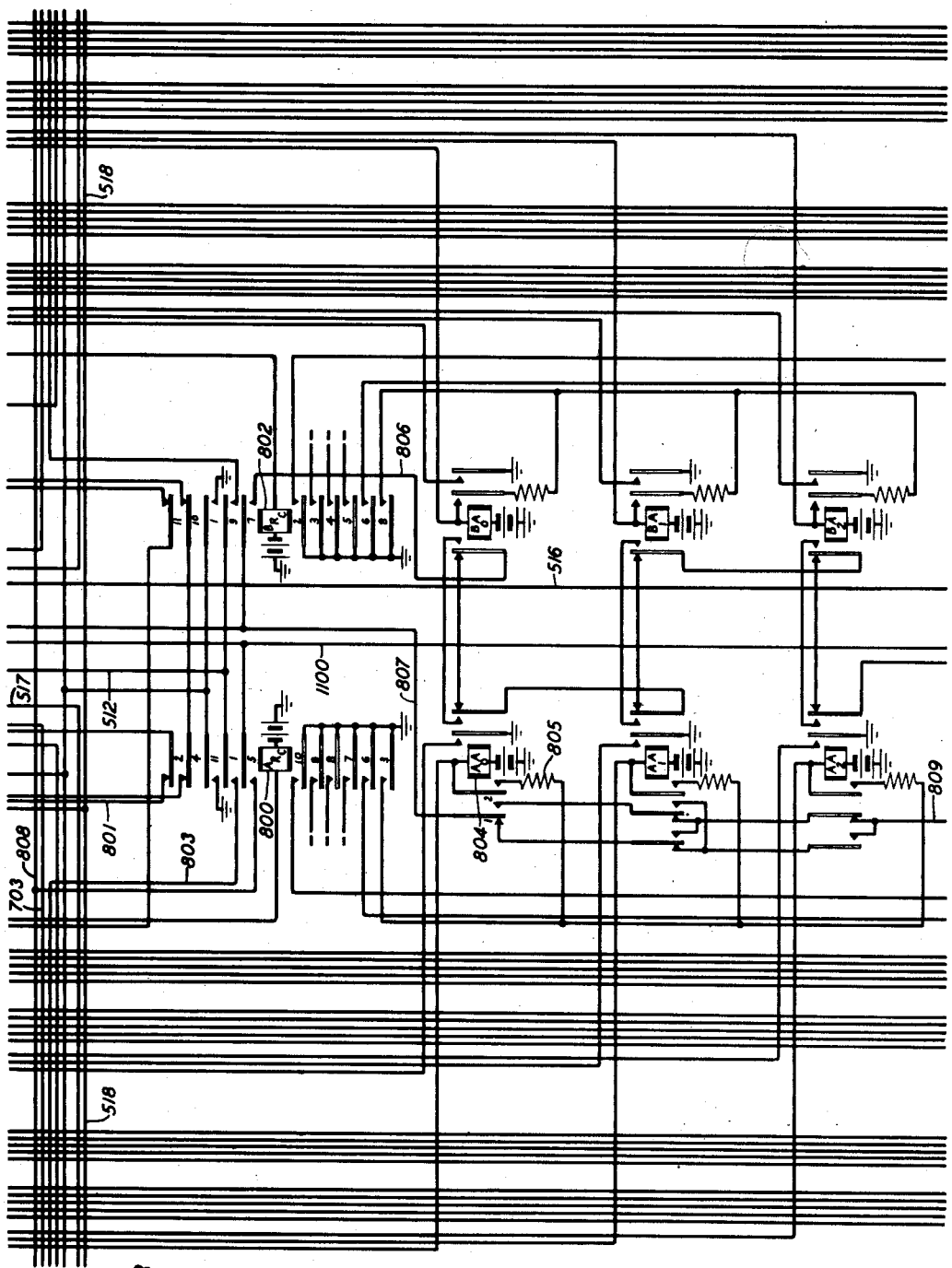
FIG. 8
INVENTOR
L. A. KILLE
ATTORNEY Sept. 28, 1954 L. A. KILLE 2,690,299
TESTING SYSTEM
Filed Aug. 13, 1948 14 Sheets-Sheet 11

INVENTOR
L. A. KILLE
BY
ATTORNEY

Sept. 28, 1954  L. A. KILLE  2,690,299
TESTING SYSTEM
Filed Aug. 13, 1948  14 Sheets-Sheet 12
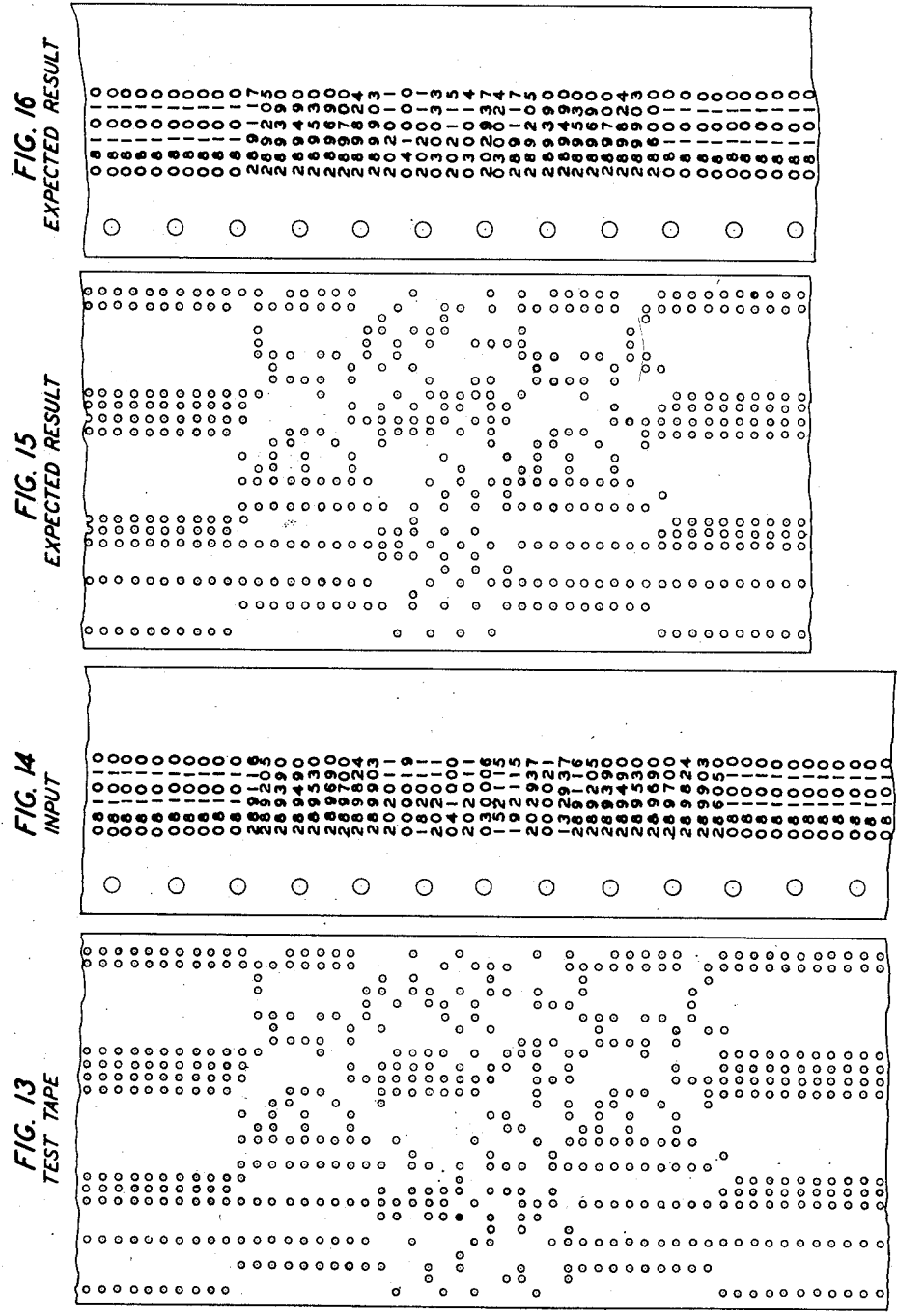
INVENTOR
L. A. KILLE
BY
ATTORNEY Sept. 28, 1954 L. A. KILLE 2,690,299
TESTING SYSTEM
Filed Aug. 13, 1948 14 Sheets-Sheet 13

READER CONTACT CLOSURE INTERVALS

INVENTOR
L. A. KILLE
BY
ATTORNEY

Sept. 28, 1954     L. A. KILLE     2,690,299
TESTING SYSTEM
Filed Aug. 13, 1948     14 Sheets-Sheet 14
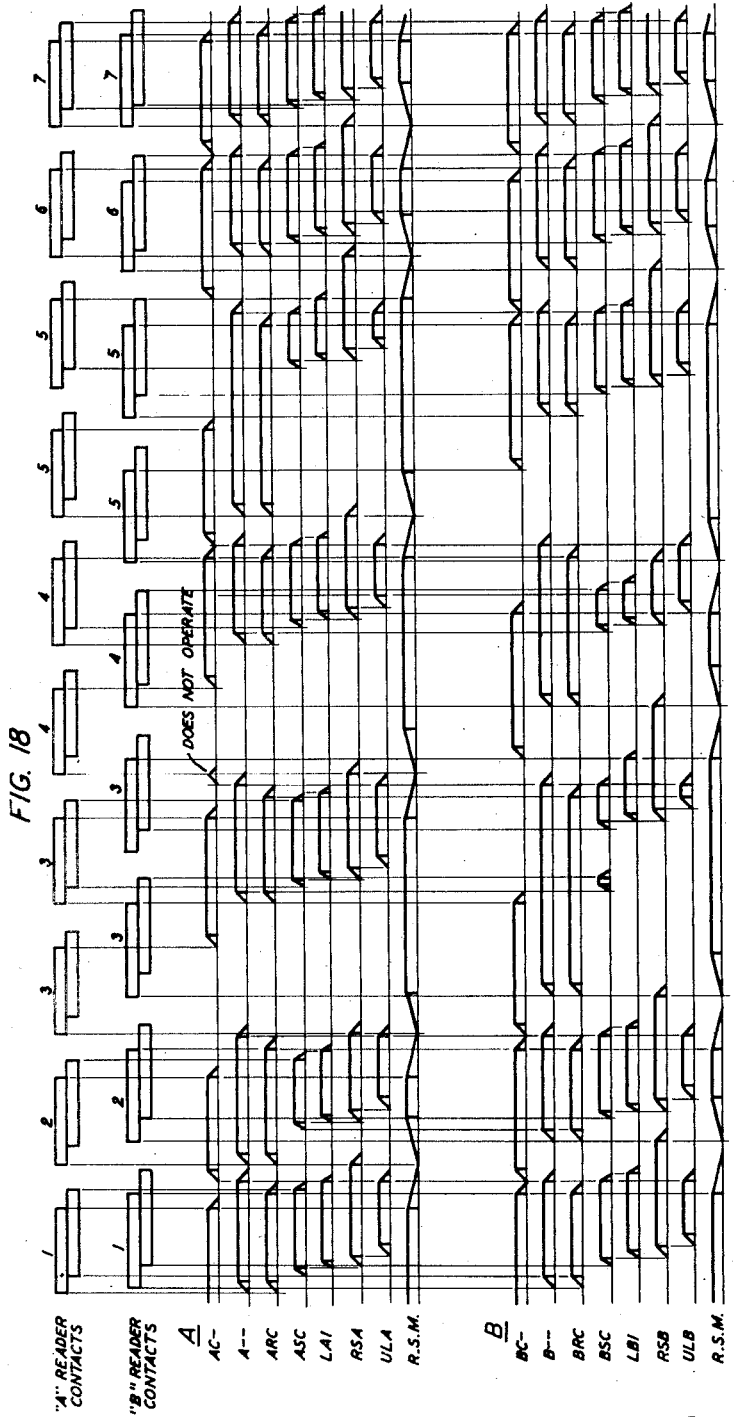
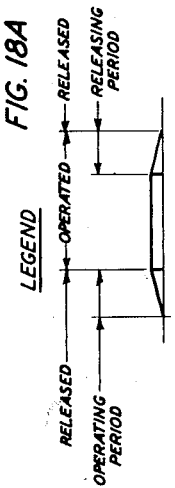
INVENTOR
L. A. KILLE
BY
ATTORNEY Patented Sept. 28, 1954

2,690,299

UNITED STATES PATENT OFFICE 2,690,299

TESTING SYSTEM

Lindley A. Kille, Morristown, N. J., assignor to Bell Telephone Laboratories, Incorporated, New York, N. Y., a corporation of New York Application August 13, 1948, Serial No. 44,130

3 Claims. (Cl. 235—61.11)

This invention relates to testing systems and particularly to means for testing the accuracy and capabilities of a device which operates through extensive and complicated electrical circuits.

In an automatic accounting system, by way of example, accounting devices are employed for processing data by assembling, sorting, translating, computing and otherwise rearranging coded items of information recorded on an incoming tape and producing as a result of such processing one or more outgoing tapes containing the same information but advanced one or more steps in an accounting process. These accounting devices are complicated, automatically operating electrical arrangements, each having a reader for entering into the circuits of the device the information perforated in codes on the incoming tape and a plurality of perforators for recording in perforated codes on a corresponding plurality of outgoing tapes the results of the accounting step taken by the device. Both the input and the output of each of these devices is, therefore, in the form of perforated tapes.

The object of the present invention is to provide means for testing the operativeness and the accuracy of the various devices. Conventional electrical testing means would require an undue amount of time and the results would depend on the capabilities and alertness of the operator. Routine testing means would be economically impossible, for the capabilities of the various devices are so great and the circuits so extensive and complicated that any routine testing means would have to be equally extensive, complicated and expensive.

In accordance with the present invention a method of accurately testing such devices is employed. Test tapes are prepared, each arranged to be fed into a particular one of these devices to cause the said device to perform certain of its functions, the tapes being arranged to exercise the device over a wide range including all components thereof. A companion tape for each said test tape is also prepared containing an exact duplicate of the results that are expected when the device is in perfect working order. The device is then placed in operation using a particular test tape as an incoming tape and one or more outgoing tapes are thereby produced. These outgoing tapes are then compared with the said expected result tapes. Only when nonconformity between the output tapes and the expected result tapes is detected are the services of a skilled operator or maintenance operative required. Otherwise, any clerk having no knowledge of or experience with electrical circuits or of the complicated nature of the apparatus may carry on these highly technical testing operations. The only skill required is in the producing of the original test tape and its companion the expected result tape and after that the skill of a person in finding and correcting some reported unstandard condition. Providing the devices are in good working order the operation becomes mere clerical routine.

A feature of the invention may then be stated as a method of testing a device adapted to operate in response to coded items recorded on an incoming tape and to produce as a result of its operation outgoing tapes having recorded therein other coded items, which consists in preparing an operator tape arranged to exercise the device over a wide range of its functions, preparing companion expected result tapes, operating the device by the said operator tape and comparing the resulting outgoing tapes with the said expected result tapes.

For carrying out this method, a tape comparing device is employed. Tape comparing devices are not unknown in the prior art but the device presently employed and disclosed herein has many specific points of novelty.

The tape comparer essentially comprises a pair of readers each of which independently reads a code from a tape and reports it to a register. When a code on one tape is to be compared to a code on the other tape, then both codes are registered and an identity circuit is closed if and when the two codes appear to be identical and also prove to be a legitimate code. When the identity circuit is satisfied then the two registers are released and made ready for the next operation and a signal to advance each tape is given. Thereafter each reader independently responds by stepping its tape and reading the next code into its register.

The readers are motor-driven and the sensing pins are periodically and rapidly reciprocated for repeatedly and rapidly reading the code which at the time is in the reading position. When the circuits involved signal the fact that the tape may be advanced for reading the next code, then a reader step relay is energized and this results in an operation enabling the reader to advance the tape one step. Under perfect (circuit) conditions the reader will read one code and then advance the tape to the next so that the codes on the tape may be read at comparatively high speed. However, certain circuit conditions may be established which will cause the reader to repeatedly read the same code a number of times.

Each reader controls, in its movement, a plurality of circuit makers and breakers and these are arranged so that in a complete cycle of operations a given contactor will close a circuit for a given part of the cycle and open it for the remainder of the cycle. Thus, a train of pulses is generated by this constant speed device each of which bears a definite relation to the movement thereof. These pulses are employed in the control of the circuits into which codes are read and in turn in the control of the reader itself. Thus, when the identity circuit reports that identical codes have been read from each of two tapes, the reader step relays for each reader are operated. However, the reader cannot step its tape along unless this operation occurs prior to a definite time in the cycle of operations as defined by the said train of pulses. If the reader step relay becomes operated later than this the stepping operation is deferred until the next cycle. Thus, it is not necessary that the two readers be maintained strictly in step with each other, an operation which would be difficult to achieve since the devices are driven by separate motors. While it has been found in practice that reasonable match in speed of these readers is practically obtained, still no special means for this purpose is provided.

A feature of the invention, therefore, may be stated as means for comparing the results of the operation of two code readers each operating independently at its own characteristic speed.

Another feature of the invention is a tape comparer comprising a pair of independent constant speed readers for reading codes from two tapes being compared, a register for each said reader, an identity circuit controlled by said registers and a stepping circuit for causing each said reader to advance its tape one step at a time for each operation of the said stepping circuit.

Other features will appear hereinafter.

The drawings consist of fourteen sheets having eighteen figures as follows:

Figs. 1 to 11, inclusive, arranged as shown in Fig. 12 on the same sheet with Fig. 1 show a complete circuit diagram for a tape comparer and in which:

Fig. 5 represents the motor off-normal means, the relays and the start keys;

Fig. 8 represents the A digits of the A and B registers;

Fig. 13 is a representation of a test tape;

Fig. 14 is a verbatim printed record of the tape shown in Fig. 13;

Fig. 15 is an expected result tape prepared as a companion to the test tape of Fig. 13;

Fig. 16 is a verbatim record of the expected result tape, Fig. 15;

Fig. 18 is a sequence chart showing the operation of the circuits of two readers which are not running at the same speed;

Fig. 18A is a legend showing the convention by which the operating and relieving periods and the time during which a relay is steadily operated are depicted in Fig. 18.

Figure 1:
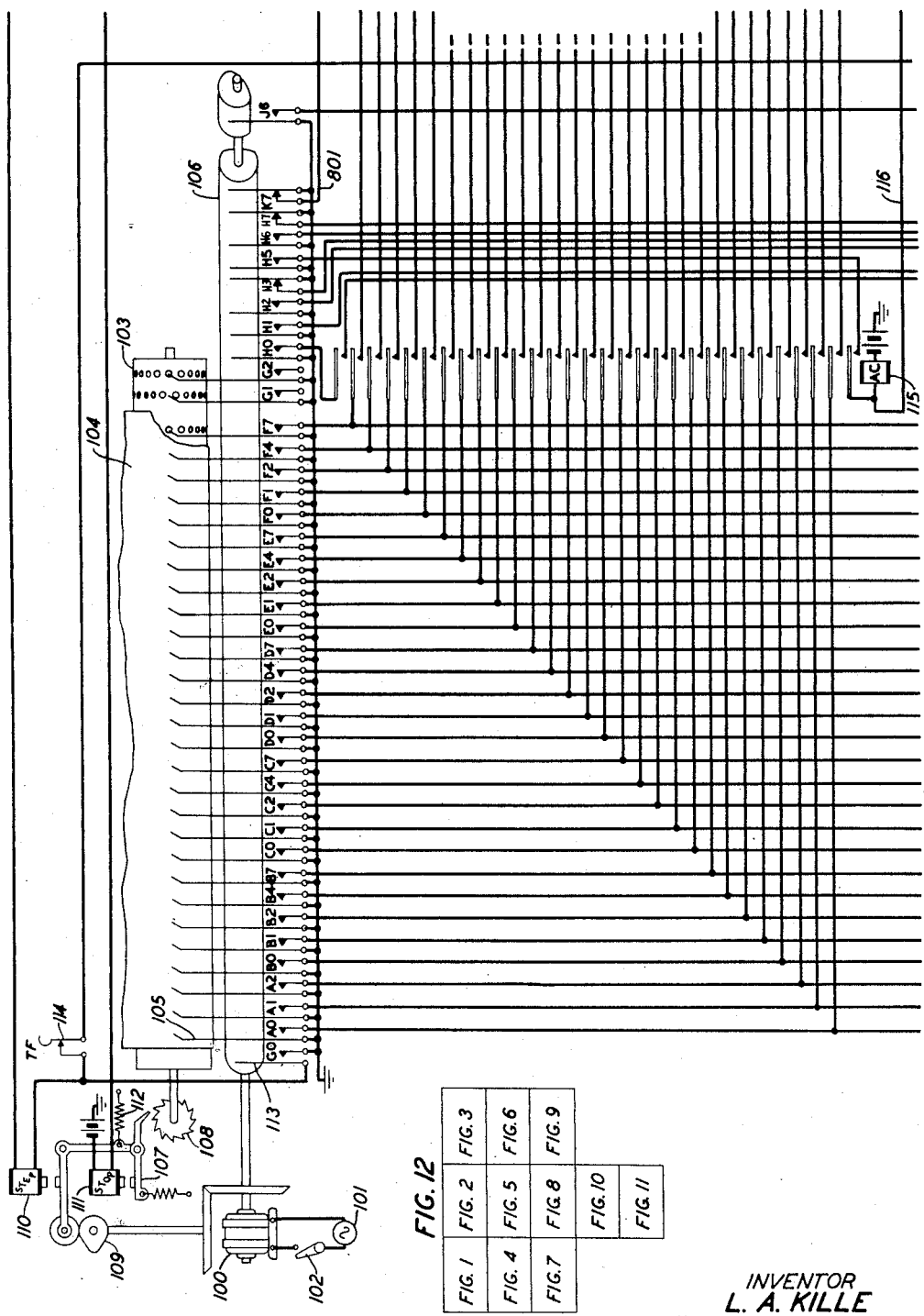
Fig. 1 represents a first reader here designated reader A.
Figure 2:
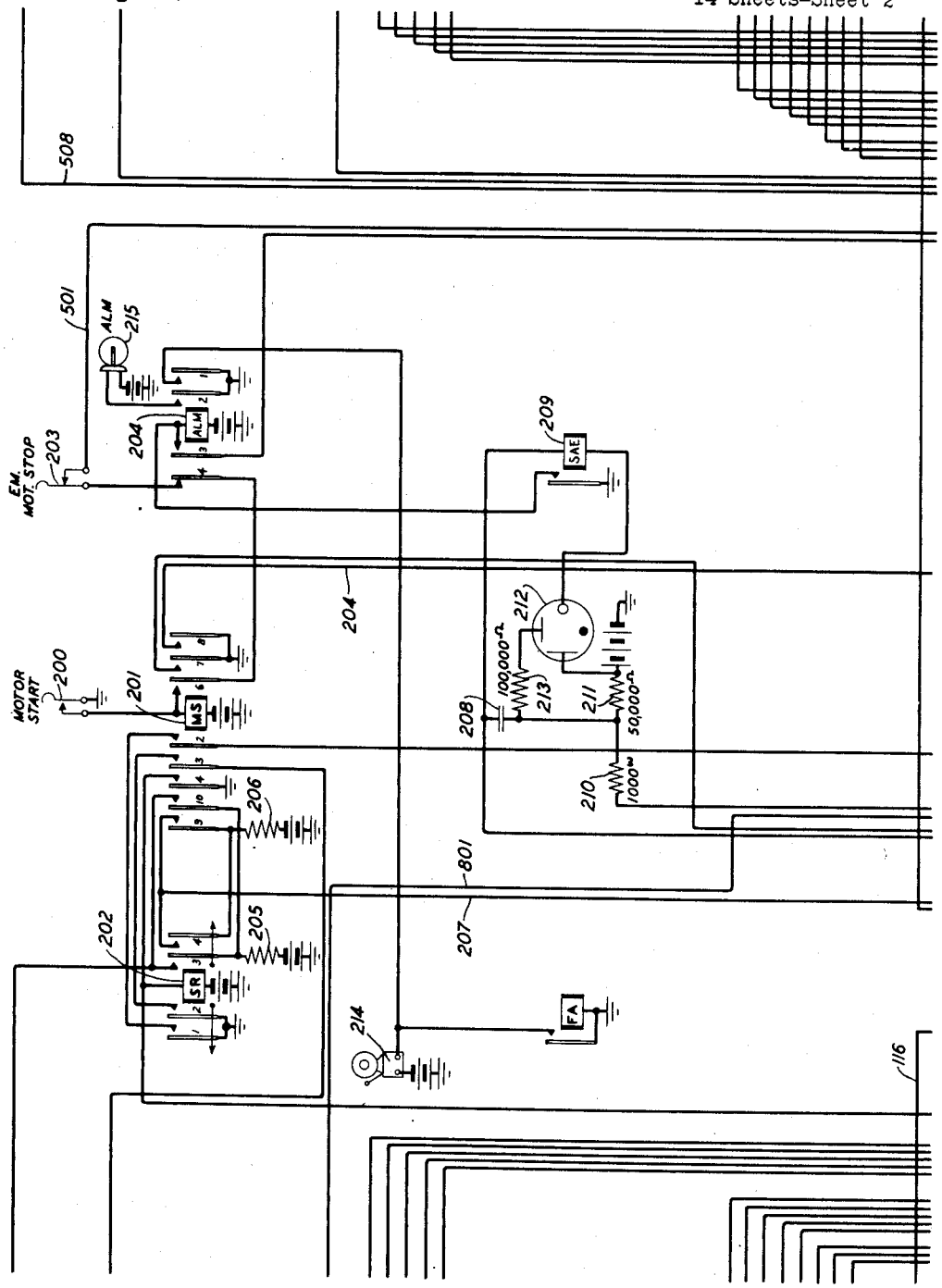
Fig. 2 represents the motor start means.

In the description that follows the codes used for expressing information are mentioned at a number of points. These codes consist of six-digit numbers which are arbitrarily designated the A, B, C, D, E and F digits. Since the purposes of the automatic accounting system are fully satisfied with a maximum of four values in the A digit place this place is thereby represented by a three-place code as follows:

| Value | A-0 | A-1 | A-2 |
|---|---|---|---|
| 0 | √ | | |
| 1 | | √ | |
| 2 | | | √ |
| 3 | √ | √ | √ |

Each of the other digits are expressed in a five-place code as follows:

| Value | B-0 | B-1 | B-2 | B-4 | B-7 |
|---|---|---|---|---|---|
| 0 | | | | √ | √ |
| 1 | √ | √ | | | |
| 2 | | √ | √ | | |
| 3 | √ | | √ | | |
| 4 | | | | √ | |
| 5 | | √ | | √ | |
| 6 | | | √ | √ | |
| 7 | √ | | | | √ |
| 8 | | √ | | | √ |
| 9 | | | √ | | √ |

The above is known as the two-out-of-five code since with five relays in a register, for instance, to express any of the ten digital values two of such relays will be operated. This makes a convenient arrangement because the validity of a code may be checked by noting that two and two only of the relays for a denominational place have been operated.

In the reader, for instance, the reading pins are designated in accordance with the above codes from A0 to F7, inclusive.

Let us first consider the tapes shown in Figs. 13 and 15, as translated in the tapes 14 and 16, respectively.

In the automatic accounting system disclosed in copending application Serial No. 724,992, filed January 29, 1947, by W. W. Carpenter and J. W. Gooderham, which has matured into Patent 2,558,476, granted June 26, 1951, it has been explained that each of the accounting devices is operated by an incoming tape and will produce therefrom one or more outgoing tapes. In order to simply explain the present invention, the test tape here is pictured in Fig. 13 is a tape which will be introduced into the summarizer. The summarizer will be expected to process this tape and produce therefrom a tape such as that shown in Fig. 15.

It has been further explained in the said Carpenter-Gooderham patent that each tape is identified by a particular number which will convey the information that such a tape has been produced in a certain manner and will only operate in a given one of the accounting devices. Thus, the tape in Fig. 13 is what is known as a number 16 tape, that is, a message unit tape which has been issued from the sorter in which a sorting in accordance with the thousands digit of the calling line directory number has been made. This tape may thereafter only be used in the summarizer and when so used will produce a number 17 tape. Looking down the line of codes in Fig. 14 one will note ten repetitions of the code 081010. The next code is 289116, the last two digits of this number being the identification of the tape. Therefore, when such a tape is placed in the summarizer the expected result of this will be 289117 and this will be found as the eleventh code in Fig. 16.

A number 17 type tape is a message unit tape which has issued from the summarizer and may be used as the input tape:

(a) In the sorter on a units sort for accumulation with newly acquired information to produce a number 18 tape.
(b) In the printer for the production of subscribers' bills.

Reading down the list of codes in Fig. 14, nine codes will be noted, the first three digits of which are invariably 289 and the fourth digit of which is numbered 1, 2, 3, etc. These are known as the tape identity codes which serve for certain control purposes in the operation of the accounting devices. When a tape having these codes is placed in the summarizer and the tape identity switches have been manually set, such a tape will pass through the reader thereof and prepare the device for its proper operation.

The expected result of these codes will be an exact reproduction of them with the exception of the first code which changes from 289116 to 289117. This may be seen by reading down the list of codes in Fig. 16.

The first seven codes directly following the tape identity series comprise a group of four entries all recording charges to be made against line number 2011.

The first is a two-line entry (the number of message units is more than can be expressed by a single digit) establishing a charge of 19 MU 202011
000019

The second is a single line entry (the number of message units may be expressed by a single digit) establishing a charge of 8 MU

182011

The third is a two-line entry (the result of a previous summary) establishing a charge of 1000 MU 202011
041000

The fourth is a two-line entry (the result of a previous summary and the excess over an even thousand) establishing a charge of 6 MU 202011
030006

Now, when these entries are processed by the summarizer it is to be expected that the sum 19
8
1000
6
———
1033 will be derived and then expressed on the output tape of the summarizer in the form of two entries.

First, a two-line entry for the even thousand MU, as 202011
041000

Second, a two-line entry for the excess 33 MU, as 202011
030033

The next two codes on the test tape comprise a group of two entries recording charges to be made against line number 2115.

The first is a single line entry establishing a charge of 5 MU

152115

The second is a single line entry establishing a charge of 9 MU

192115

When these entries are processed by the summarizer, it is to be expected that the sum 5
9
—
14 will be derived and then expressed on the output tape of the summarizer in the form of a single two-line entry, as 202115
030014

Lastly, the next three codes comprise a group of two entries recording charges to be made against line number 2937.

The first is a two-line entry establishing a charge of 21 MU 202937
000021

The second is a single line entry establishing a charge of 3 MU

132937

When these are processed by the summarizer, it is expected that the sum 21
3
—
24 will be derived and then expressed on the output tape of the summarizer in the form of a single two-line entry, as 202937
030024

Thus, from the twelve codes 202011
000019
182011
202011
041000
202011
030006
152115
192115
202937
000021
132937 it is expected that the summarizer will produce the following eight lines:

```
202011
041000
202011
030033
202115
030014
202937
030024
```

Therefore, an expected result tape is prepared as a companion to the test tape so that when at any time it is wished to test the operativeness and accuracy of the summarizer these tapes may be used. The test tape is placed in the summarizer and the output tape produced thereby is then compared with this expected result tape. If the comparison proves that the expected result tape is identical with the output tape, then it is certain that every component of the vastly complicated circuits and apparatus of the summarizer functioned perfectly.

The above is a very simple example of the manner in which a test tape and an expected result tape are prepared. In actual practice these test tapes and expected result tapes are of much longer length containing hundreds of entries. After each has been figured out in the manner explained they are prepared by hand from lists of codes such as those shown in Figs. 14 and 16. In actual practice again these tapes may be prepared on a device such as that shown in my application Serial No. 772,301, filed September 5, 1947.

The work entailed in this process is considerable and requires a knowledge of the functions of the device which are to be tested. A test tape may be devised which knowingly will exercise every component of the device such, for instance, as every relay wired in the circuit. After the tapes have been prepared, however, the testing of the device becomes a mere routine operation which may be performed by an operator having no knowledge of the electrical circuits thereof.

It may also be pointed out at this time that experience has shown that these complicated electrical devices employing large numbers of relays may be expeditiously exercised by running a reasonable length test tape therethrough periodically such as each morning before the work of the accounting center has started. When the test tape has been run through a device the output tape produced thereby is then placed in one reader of a tape comparer and the expected result tape, companion to the test tape used, is placed in the other reader of the tape comparer. When these two tapes then run through the comparer without stoppage or the bringing in of an alarm, it is known that the device which has been tested has responded perfectly.

*The tape comparer*

The circuits shown in Figs. 1 to 11 provide a means for comparing two automatic accounting system tapes to determine if they are identical. If desired, all entry lines on both tapes may also be checked for compliance with the six-digit number registering code system used. In addition, this circuit provides for checking single tapes for compliance with the number registering code system.

The functions of this system include the following:

(1) Means is provided to sound a single stroke alarm bell, to light an alarm lamp and stop the operation of both readers if any irregular condition is encountered while making comparison or checks of tapes.

(2) Means is provided to sound a single stroke alarm bell and light a lamp if a battery fuse associated with this circuit is blown.

(3) Means is provided to permit the starting of the motors of both associated readers by means of a non-locking "motor start" key operation at any time that an alarm is not locked in or a locking "single tape" key is not operated.

(4) When the locking "single tape" key is operated the circuit permits starting of the motor of one reader only by means of a non-locking motor start key at any time that an alarm condition is not locked in.

(5) Means is provided to control the associated readers to start the tape comparison or tape checking operations when the reader motors are running and a non-locking start key is operated.

(6) Means is provided to halt a current tape comparison or tape checking operation and stop the associated reader motors when a "release" key is operated and to permit resumption of operations thereafter without interfering with the accuracy of the comparison or check.

(7) Means is provided for the release of all operated relays of the circuit by the simultaneous operation of non-locking release and master release keys.

(8) Means is provided to permit the stopping of the reader motors in emergencies by the operation of an emergency motor stop key.

(9) Means is provided to stop the reader stepping but prevent bringing in the alarm or stopping of the reader motors when any irregular condition is encountered so long as the non-locking start key is held operated.

(10) When the reader motors are running, means is provided for single line stepping of either reader and release of the associated registered relays if operated by the operation of an associated reader step key.

(11) Means is provided for continuous stepping of either reader under control of the tape feed key located on each reader whenever the associated reader motor is running.

*Circuit arrangement*

This arrangement consists of a relay bay mounting a key and lamp control panel in addition to the necessary relays and apparatus for controlling two readers. The two readers are arbitrarily designated A and B and are mounted in adjacent cabinets. By means of this set-up, two automatic accounting system tapes may be checked for identity of all digits. The tapes being compared may be normal tapes (i. e., tapes intended to have one and one only or all three perforations in the "A" digit and two and two only perforations in each of the B, C, D, E and F digits) or may be tapes for test purposes only and which have defective digits on some lines. When normal tapes are being compared, both tapes may be checked if desired at the same time for the one and one only or all three and the two and two only punched holes. In addition, a single normal tape may be checked for the correct number of punched holes in all digits without any comparison with another tape.

Readers

The function of the readers is to read the perforated information on the tape, to control the advance of the tape, and to provide various closures for the controlling circuit. It is operated by a motor which is under control of the motor start key. In the drawings the motor start key 200 is shown as controlling the motor start relay 201. The motor 100 of the reader A is shown as being controlled from a source of alternating current 101 by means of a switch 102. In actual practice the motor start relay 201 upon operation operates a relay which will close the switch 102 but since this is a conventional arrangement it is not shown in detail at this point.

The reader contains a rotatable perforated drum 103 over which the tape 104 is carried, together with motor-driven reading pins, a step magnet, a stop magnet and control contacts actuated by various cams. The reader is equipped with twenty-eight reading pins such as the pin 105 arranged to line up with the holes in the drum and with the perforations on the tape. These pins are operated with a reciprocating motion from a motor-driven cam 106 and are arranged to make contacts when registered with perforations in the tape. The drum 103 is rotated one line at a time in coordination with the in and out movement of the reader pins by means of a pawl (107) and ratchet (108) mechanism actuated by a cam (109) on the motor-driven shaft. This rotation, however, may be permitted or blocked under control of a magnet 110 called the reader step magnet which must release in order for the pawl 107 to engage the ratchet 108 and cause the drum to rotate. Also another magnet 111 called the stop magnet is provided. This magnet has to be energized to cause the pawl 107 to engage the ratchet 108 and thus permit the drum to rotate. It is used to prevent the drum from rotating while the motor is stopped and during the process of starting and stopping the motor the reciprocating motion of the reading pins is dependent only upon the running of the reader drive motor 100 and is entirely independent of the rotation of the reader drum and the advance of the tape. Thus if the advance of the drum is blocked the same line on the tape is read repeatedly.

Reader step magnet

When the step magnet 110 of the reader is not energized the reader will function to rotate the drum and step the tape to the next line on each revolution of the reader shaft. When the step magnet is energized from the circuit of the device the spring 112 controlling the rotation of the drum will not drive the pawl 107 and the reader will not step to the next line. The winding of the step magnet is connected to ground through the G0 contact 113 controlled by the cam 106. This magnet cannot release while any pins are in the tape in the reading position. The G0 contact closes when the cam 106 moves the pins into the tape. Normally, the circuit controls the stepping of the reader by a ground path from a contact on the RSA relay 709. When the ground path is open the reader will step when the pins are withdrawn from the paper. Battery is supplied to the step magnet as soon as the motor start relay 201 is operated.

Reader stop magnet

A stop magnet 111 is provided to keep the reader drum from advancing. It is effective only when deenergized. When starting operation, it is arranged to operate after the step magnet is energized. It will be noted that when the motor start key 200 is momentarily operated the motor start relay 201 will respond. This in turn will close an obvious circuit for the slow release relay 202. Therefore, upon the operation of the motor start relay 201 the step magnet 110 will be operated but it is not until after the slow release relay 202 has also been operated that a circuit will be closed for the stop magnet 111. When shutting down, it is arranged to be released before the step magnet is released by virtue of the fact that its circuit is also controlled by the motor start relay 201 whereas the step magnet is held momentarily through the slow releasing feature of the relay 202. Thus, when power is removed from the circuit for any reason the tape is not allowed to advance falsely.

Common reader contacts

Figure 17:
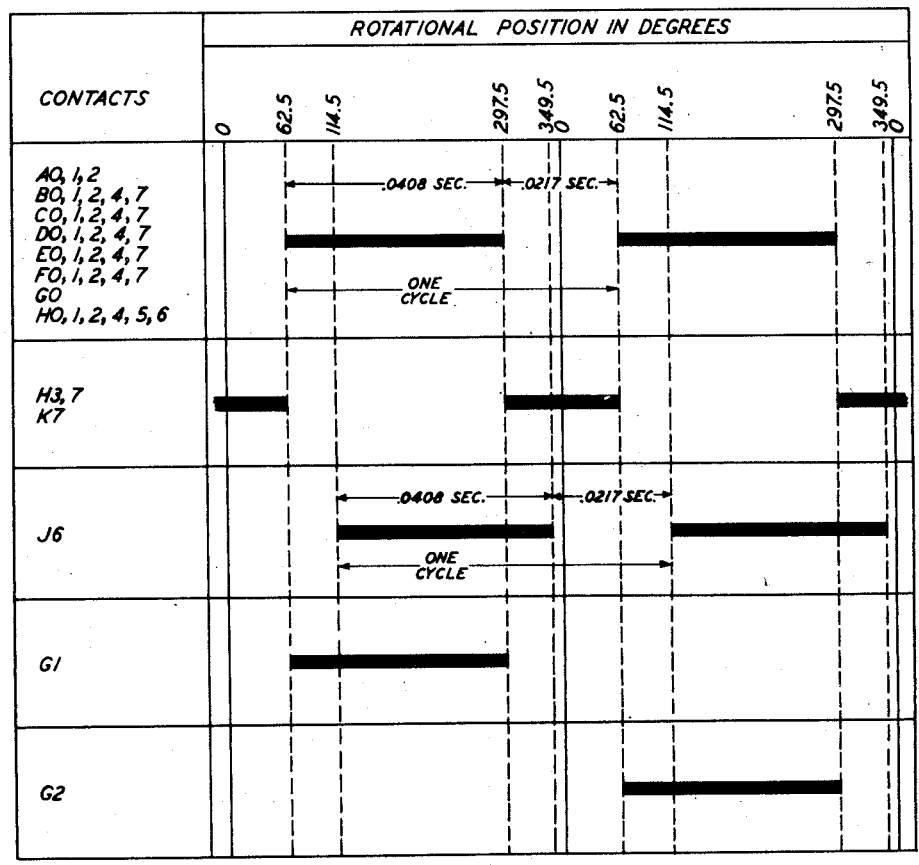
Fig. 17 is a timing chart showing the intervals during which contacts are closed by the reader.

The control contacts are actuated under control of the reader drive motor and close and open independently of the tape pattern. The timing and phasing of the reading and control contacts of each reader are shown in Fig. 17 where the closure of a contact is indicated by a heavy line extending between vertical dotted lines indicating the rotational position in degrees extending from 0 through 360 degrees. In this chart two cycles are shown and the various closures and openings of the contacts are shown in fractions of a second based on the assumption that the reader is operating at a normal 16 cycles per second. All of the reading contacts and the H and K contacts (excepting H3, H7 and K7) make and break in synchronism, the make period being approximately twice the break period. The H3, H7 and K7 contacts are closed when the reading contacts are opened and open when the reading contacts are closed. The single J contact shown makes and breaks about 9 milliseconds after the reading contacts. The reader drum advance takes place while the reading pins are withdrawn from the drum.

The G1 and G2 contacts make on alternate steps of the drum and are used in a circuit (not shown herein) to check that the reader steps when the reader step relays operate.

Tape feed key

A non-locking tape feed key 114 is mounted on the reader. With the motor running, operation of the TF key 114 opens the holding circuit for the step magnet thus permitting the reader drum to rotate independently of the rest of the circuit. With the tape feed key operated the drum advances on each revolution of the reader shaft. Its use is intended primarily to step the tape into or out of the reader. It is effective only when the circuit is normal.

General operation

Figure 3:
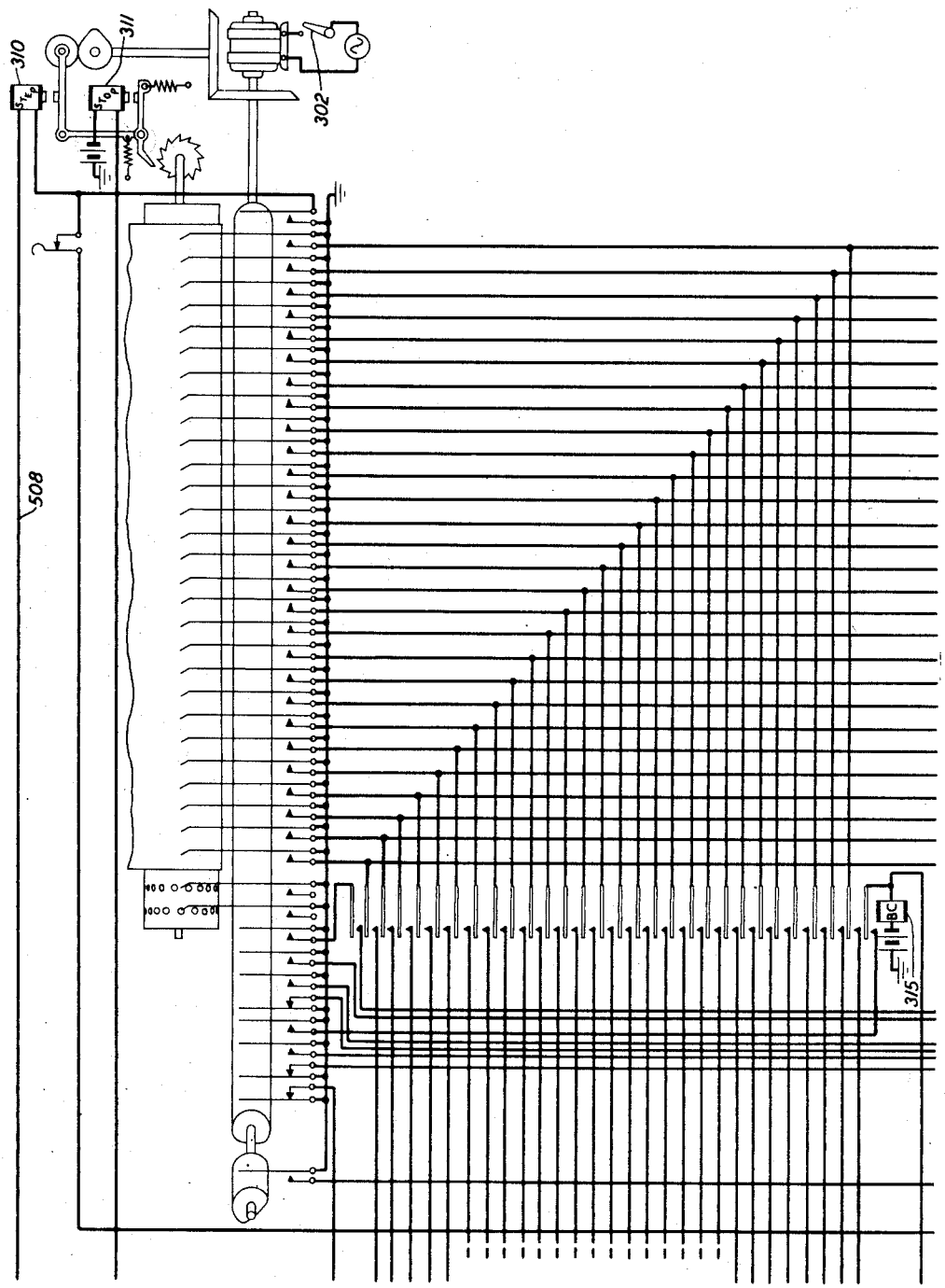
Fig. 3 represents reader B.

For comparing two tapes the circuit is placed in operation by momentarily operating the motor start key 200. This causes the operation of the motor start relay 201 which locks in a circuit from ground, a normal contact of the RLS key 500, conductor 501, through the contacts of the emergency stop key 203, back contact and armature 4 of alarm relay 204, the armature 6 and front contact of the motor start relay 201 to the winding thereof. As a result of the operation of the motor start relay 201, the slow release relay 202 is operated so that the motors of reader A in Fig. 1 and reader B in Fig. 3 are operated as well as the step and stop magnets thereof. If the tapes to be compared are supposed to be normal tapes, the locking single tape key 502 and cancel check key 503 should be normal. The tapes being compared are then fed into the readers using the reader tape feed key 114 to feed the associated tape onto the splice pattern. At this time either the reader lamps key 400 or the register lamps key 401 should be operated. The operator then presses and holds the non-locking start key 504 causing the two readers to start registering, comparing and stepping so long as both tapes continue to present identical splice patterns to their respective readers. The start key is held operated to avoid the sounding of the alarm due to a mismatch which would otherwise occur when one reader completes the readings of splice pattern and reads any other entry while the other reader is still on splice pattern. When one reader has completed the last line of splice pattern and reads any other line the registering and stepping process will normally come to a halt due to a mismatch. If both readers have exactly the same number of lines of splice pattern to read after the operation of the start key and if the subsequent lines of both tapes are identical, no mismatch will occur at this point and the start key may be released as soon as it is evident that both readers are beyond the splice pattern. If a mismatch occurs and the operation comes to a halt, the operator will then note on the respective lamp displays which reader is still reading splice pattern and step this reader over the remaining lines of splice pattern by operating and releasing the A reader step key 701 or the B reader step key 901 while continuing to hold the start key, the associated reader stepping one line for each operation of the reader step key until a match is achieved. When the lagging reader is stepped off of the last splice pattern line and reads and registers an entry line identical with that already registered by the other reader, the normal process of reading, registering, comparing and stepping will be automatically resumed. The associated reader step key should not be operated again, and the start key should be released. This process of reading, registering, comparing and stepping will then continue so long as successive lines of normal entries of the two tapes each read by the readers cross-check as being identical. When a mismatch occurs due to a lack of agreement between the two tapes or if any digit of any line contains an abnormal number of code holes, stepping of the readers will halt on the lines on which the mismatch or abnormal tape occurs, both reader motors will be stopped, a single stroke alarm bell will be sounded and an alarm lamp lighted. The alarm lamp is extinguished by operating the RLS key 500. The last number registered by each reader may be determined by operating the lamp display key to the register lamp's position or if desired as a check on the accuracy of the register the last numbers read by the two readers may be determined by operating the lamp display key to the reader lamp's position, turning each reader by hand if required to cause the contacts associated with the reading pins to be in the make position. After the defect has been noted if it is desired to proceed with the comparison of the remainder of the two tapes this may be accomplished by restarting the machine as previously described by operating the motor start and start keys and stepping each reader off of the mismatch lines by means of the A reader step key 701 and the B reader step key 901 while holding the start key to avoid bringing in the alarm. If preferred the motor start key only may be operated and the two readers stepped to matching lines before operating the start key thus permitting manual check of as many lines as desired before resuming machine comparison. As soon as the readers once more resume the normal process of reading, registering, comparing and stepping the start key should be released as before.

The machine may also be stopped at any time by the operator by operating the RLS key 500 and the operation resumed by operation of the motor start key 200 and the start key 504 as already described, without interfering with the accuracy of the comparison process. For quick stops in emergencies or in case circuit trouble interferes with the normal release key function the machine may also be stopped by operating the emergency motor stop key 203. This action, however, will interfere with the accuracy of the tape comparison. For long period shut-downs after an alarm condition or after the RLS key 500 has been operated the RLS key 500 and the MRL key 505 may be operated to release the register relays and this action will not interfere with the accuracy of the comparison when the operation is resumed. Usually an alarm will also be sounded and the reader will be stopped when one reader runs out of tape. The readers will normally be stopped when the end of the tape is reached by one reader due to the mismatch which results from one tape having run out while the other is still reading splice pattern. However, in case the cancel check key 503 is operated and an identical number of splice pattern lines appear on both tapes both readers will continue to run and step until power is shut off or the RLS key 500 is operated and under this condition no alarm will be given.

*Comparing and checking abnormal tapes*

In case it is desired to check two tapes which do not have one and one only or all three perforations in all A digits and two and two only perforations in all B, C, D, E and F digits this may be done as just described except that the cancel check key 503 is operated before starting. The circuit then functions as described except that the readers will be stopped and an alarm sounded only in case an entry line as read by either reader fails to match as identical with that read by the other reader.

*Check of single normal tape*

By operating the single tape key 502 and feeding the tape into the A reader of Fig. 1 only, a single normal tape may be checked for the validity of the codes. The starting and stopping is otherwise as described above except that the alarm will be sounded and the reader automatically stopped only when a defective digit is encountered or when the end of the tape is reached.

*Detailed operation.—Starting motors*

The operation of the motor start key 200 operates the motor start relay 201 which locks in the manner above described. The motor start relay 201 also operates the off-normal relay 506 over a circuit extending from ground, armature 8 and front contact of the MS relay 201, conductor 204 to the winding of the MON relay 506. The MON relay locks in a circuit from ground, a normal contact of the RLS key 500 or a normal contact of the MRL relay 505 over the armature 5 and front contact of the MON relay 506 to the winding thereof. The operation of the motor start relay 201 also connects battery through resistance 205, the armature 10 and front contact of the MS relay 201 to the step magnet 110. At the same time a circuit is established from battery through the resistance 206, the armature 9 and front contact of the MS relay 201, conductor 207, the normal contacts of armature 5 of the STC relay 507, conductor 508 to the step magnet 311 of the B reader. The slow release relay 202 is operated by the MS relay 201 in the manner described. With the SR relay 202 operated ground is connected to operate the stop magnets of both readers and additional paths for the resistances 205 and 206 are closed to their respective step magnets. The MON relay 506 operated lights the MON lamp 509 to indicate an off-normal condition of the circuit. This relay prepares operating and locking paths for various relays and locks under the control of the RLS and MRL keys. The tapes should now be fed into the A and B readers using the TF keys to step the tapes onto splice pattern.

*Start of comparison*

The tape comparison processing is started by operating and holding the start key 504. The start key should be held until both tapes have been carried past splice pattern as covered in the description immediately following. The operation of the start key operates the ST relay 510. Relay ST operated, removes a shunt from about condenser 208 and connects ground to the SAE relay 209, thus preparing the alarm circuit for future operation. The alarm is held off at this time, however, so long as the start key 504 is held operated by ground from the start key connected through front contact and armature 4 of the ST relay 510 to resistance 210 thus effectively shunting the condenser 208 with the resistance 210 and holding the potential applied to the condenser down by the IR drop through resistance 211. The ST relay 510 operated also connects the windings of the cutin relays to their associated K7 contacts. Thus, a circuit may be traced from the winding of the AC relay 115, conductor 116, front contact and armature 2 of the ST relay 510, armature 2 and back contact of the ARC relay 800, conductor 801, to the K7 contact of the A reader in Fig. 1. A similar circuit may be traced for the BC cut-in relay 315.

*Comparison*

Since two readers not in exact synchronism are used, the exact relationships of reader contact and relay operations will vary, depending at any particular time on the phase relationships of the two readers. To avoid confusion the following description of the comparison process is in somewhat general terms. More exact relationships of reader cams and relay operations will be found in the operation chart, Fig. 18. In this chart, by way of example, the reader A, is depicted as operating at the rate of 16 cycles per second whereas the reader B is depicted as operating at the rate of 14.2 cycles per second, this value having been arbitrarily chosen to show the full operation in a short series of steps. In the line of closed circuits for reader A there are shown coupled together the closed periods of the reader contacts and the closed periods of the associated J6 contacts. Like representation of the contacts of the B reader are also shown.

Since the K7 contacts of a reader are closed when their associated reading contacts are opened the AC cut-in relay 115 and the BC cut-in relay 315 will operate during the open period of their respective reading contacts connecting the reading contacts to the register relays AA0 to AF7 and BA0 to BF7 and closing operating circuits for ARC relay 800 and the BRC relay 802 from the H0 contacts of the A and B readers, respectively. The next subsequent closures of the reading and H0 contacts will, therefore, operate relays of the A and B registers in accordance with the splice pattern code and will also operate the ARC relay 800 and the BRC relay 802.

The ARC relay 800 when operated locks in a circuit which may be traced from ground, armature 7 and front contact of the MON relay 506, through the back contact and armature 1 of the ULA relay 511, conductor 512, through armature 1 and front contact of the ARC relay 800, conductor 803, armature 1 and back contact of SA relay 702, conductor 703, armature 6 and front ontact of MON relay 506 to the winding of the ARC relay 800. A similar circuit for locking the BRC relay 802 may be traced through the back contacts of the SB relay 902 and the ULB relay 513. The ARC relay 800 also supplies grounds to numerous leads for locking in the A register relays. As an instance of this, it may be supposed that the AA0 relay 804 has been operated whereupon a locking circuit may be traced from ground, armature 3 and front contact of the ARC relay 800 through the resistance 805 to the front contact and armature 2 of the AA0 relay 804 and thence to the winding thereof. Likewise, the BRC relay 802 supplies grounds for locking in the B register relays.

Figure 10:
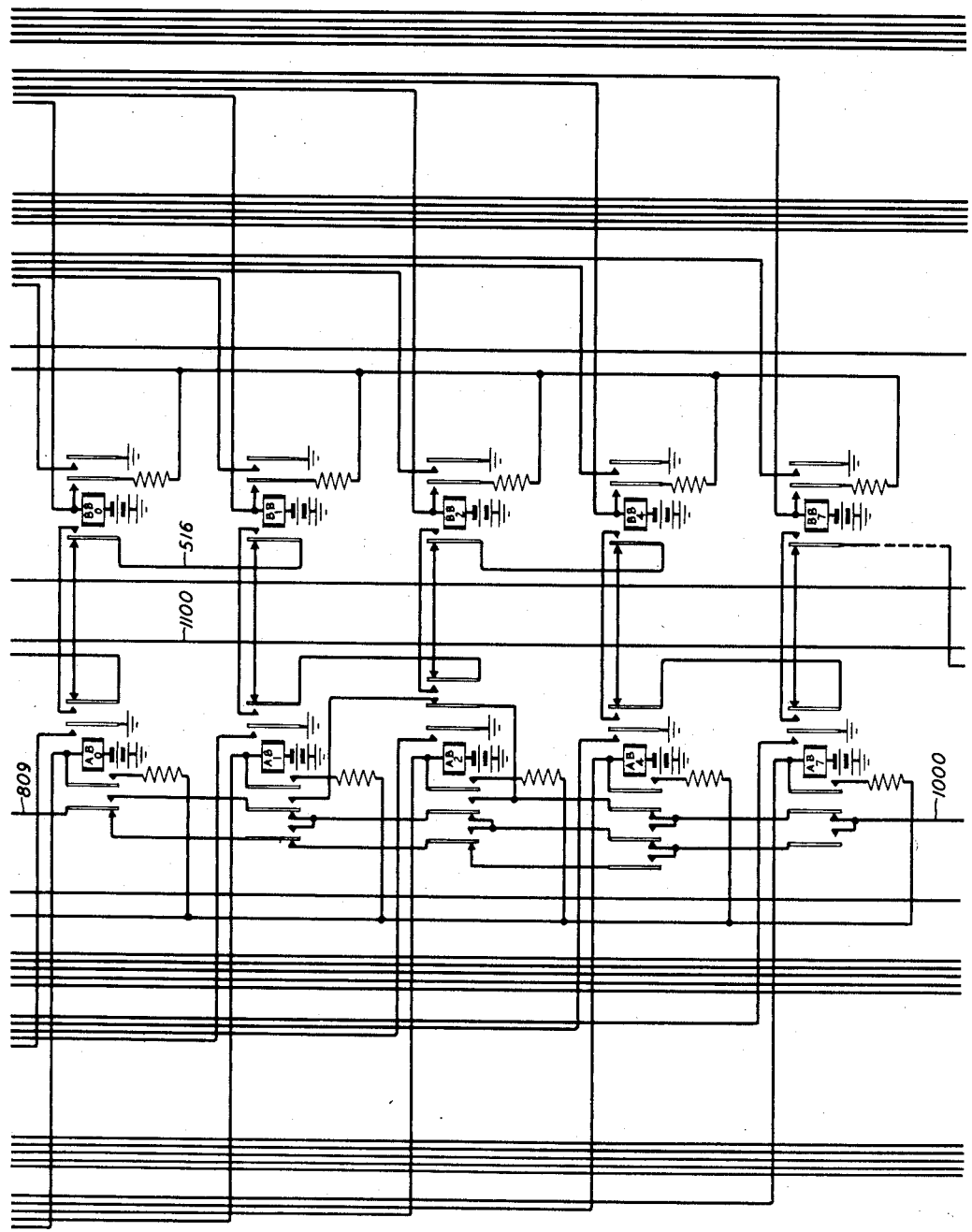
Fig. 10 represents the B digits of the A and B registers.
Figure 11:
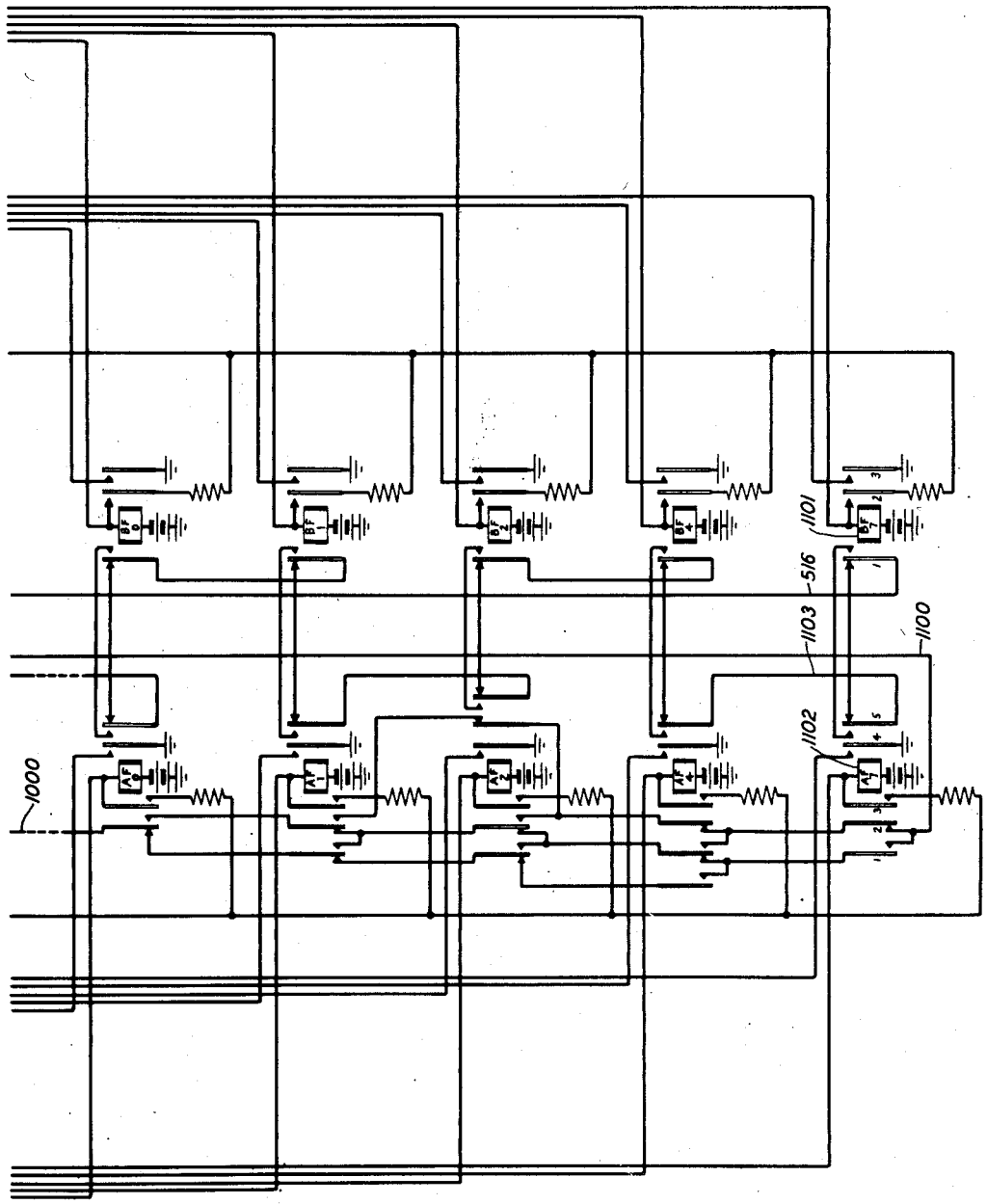
Fig. 11 represents the F digits of the A and B registers.

As soon as both registers have been filled with the splice pattern in this manner and both relays ARC and BRC are operated, a fundamental identity check circuit is thereby closed which may be traced from battery through the resistance 514, the armature 2 and back contact of the RLS relay 515, conductor 516, eventually to conductor 806 through the front contact and armature 7 of the BRC relay 802, conductor 807, through the validity check circuit of the A register relays, conductor 1100, the armature 5 and front contact of the ARC relay 800 and thence in parallel over conductor 808 in one direction through the back contact and armature 4 of the SA relay 702 to the winding of the ASC relay 704 and in the other direction through the back contact and armature 4 of the SB relay 902 and the winding of the BSC relay 904. Looking at Fig. 11 it may be noted that the identity check circuit consists of an armature 1 of the BF7 relay 1101 extending the circuit either over a back contact to a similar back contact on the AF7 relay 1102 or over a front contact thereof to a similar front contact of the AF7 relay 1102. Therefore, if both the AF7 relay 1102 and the BF7 relay 1101 are in the same condition the conductor 516 will be extended to conductor 1103 and this may be traced in series through all the register relays to conductor 806. Therefore, if the code read by the A reader is identical with the code read by the B reader then conductor 516 will be extended to conductor 806. The validity check circuit is one which will extend conductor 807 through the contacts of the A register relays to conductor 809 and will be closed whenever any one of the AA0, AA1 or AA2 relays is operated or when all three thereof are operated. In a similar manner the validity check circuit will extend the conductor 809 to conductor 1000 when and only when two of the relays of each digit of the A register and the B digit thereof shown in Fig. 10 are operated. As conductor 1000 enters Fig. 11, it is shown in broken lines to indicate that this validity check extends through the C, D and E register circuits to the circuits of the F digit shown in detail in Fig. 11. Thus, with the single tape key 502 and the cancel check key 503 in their normal position as shown the identity and validity check circuits will be closed through the windings of the ASC relay 704 and the BSC relay 904 in parallel.

The ASC relay and the BSC relay will operate provided the late make J6 contacts of their respective readers are made at this time. The ASC relay 704 when operated closes a circuit from the A reader contact H6 to operate the LA1 relay 705, the LA2 relay 706 and the RSA relay 700. The circuits for the LA1 and LA2 relays are obviously closed through armature 2 and front contact of the ASC relay 704. If the operating period of the ASC relay is cut short by a late operation thereof within the period of the associated J6 contact, then the LA1, the LA2, the RSA and the ULA relays will fail to operate as indicated during the fourth operation of the A register in the chart of Fig. 18. The operation of these relays is deferred until the next cycle of the A reader. It will be noted in the chart of Fig. 18 that the reading of the fourth line is repeated due to this operation and that synchronism between the two readers is thereafter achieved through repeating the reading of the fifth line by the B reader and thereafter repeating the reading of the fifth line by the A reader.

The ground from the H6 contact is also extended over armature 1 and front contact of the ASC relay 704 (prior to the operation of the LA1 relay) over conductor 707, front contact and armature 1 of the MON relay 506, conductor 517 to the winding of the RSA relay 700. The LA2 relay 706 locks itself and the LA1 relay 705 to the A reader contact H6, the LA1 relay 705 connecting ground through its front contact to hold the RSA relay 700 so long as contact H6 of the A reader remains closed. Similar relay action in the B reader circuit takes place.

Since the H6 contacts of the readers are in phase with the reader reading contacts this arrangement insures that the RSA relay 700 and the RSB relay 900 once operated will be held until the make of the contact H3 of their respective readers after which they continue to hold to contact H3 until the break of that contact. The RSA relay 700 operated (a) disconnects ground from the A reader step magnet to permit this reader to step during the open period of its reading contacts, (b) operates the ULA relay 511 and (c) locks to the A reader contact H3. The RSB relay 900 operated similarly disconnects ground to permit the B reader to step and operates the ULB relay 513. Relays ULA and ULB lock to the operated ARC and BRC relays so long as either one of these relays remains operated. Upon the operation of the ULA relay 511 and the ULB relay 513, the locking circuits for the ARC relay 800 and the BRC relay 802 are released whereupon the associated registers are released through the opening of the register relay locking circuits. The ARC relay 800 and the BRC relay 802 will both remain locked operated until both relays ULA and ULB operate, thus insuring the eventual release of both registers in case, due to out-of-phase condition of the two readers one of the RS-relays should release before the relays ARC and BRC have had time to release. The release of the ARC and BRC relays also recloses the operating circuits for the AC and BC cut-in relays, respectively, to contact K7 of their respective readers.

On the first closure of the K7 contacts after the release of relays ARC and BRC the AC and BC relays operate and the operation cycle just described is repeated so long as matching lines of splice pattern are encountered by both readers. When a mismatch occurs due to one reader having reached a different type of entry line while the other is still reading splice pattern the A-register relays operated will not agree with the B-register relays operated. Due to this mismatch the ASC relay 704, its associated LA1 relay 705, LA2 relay 706 and RSA relay 700 and the BSC relay 904 and its associated relays will not be operated and both readers will halt on the last lines read when the mismatch occurred.

Since it is assumed that the start key is still being held operated, direct current supplied from this key keeps the condenser 208 shunted by the resistance 210 and prevents the operation of the alarm which would otherwise occur on any mismatch as will be more fully described hereinafter.

Figure 4:
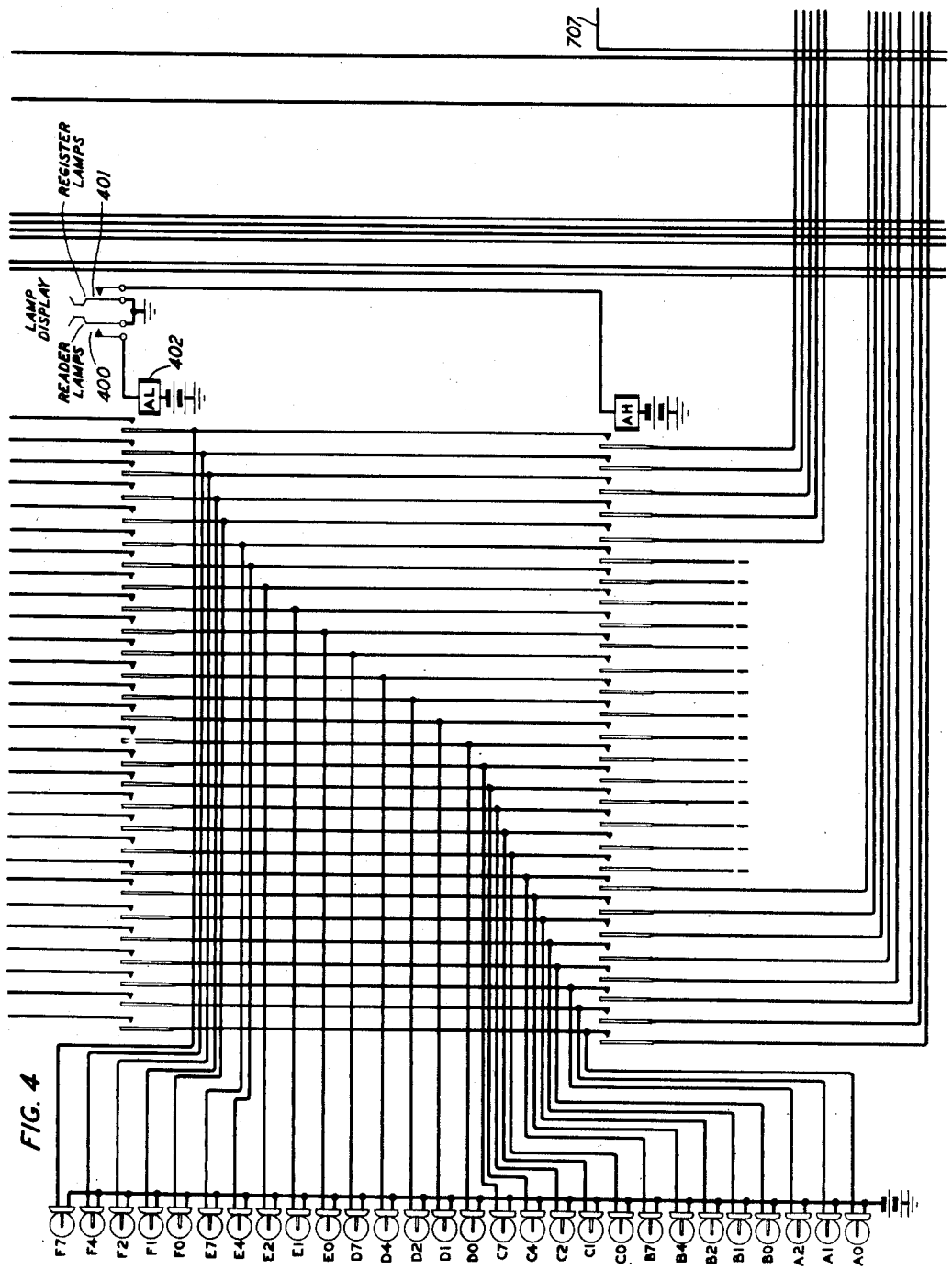
Fig. 4 represents the signal lamps which may be connected either to reader A or to the A register.
Figure 6:
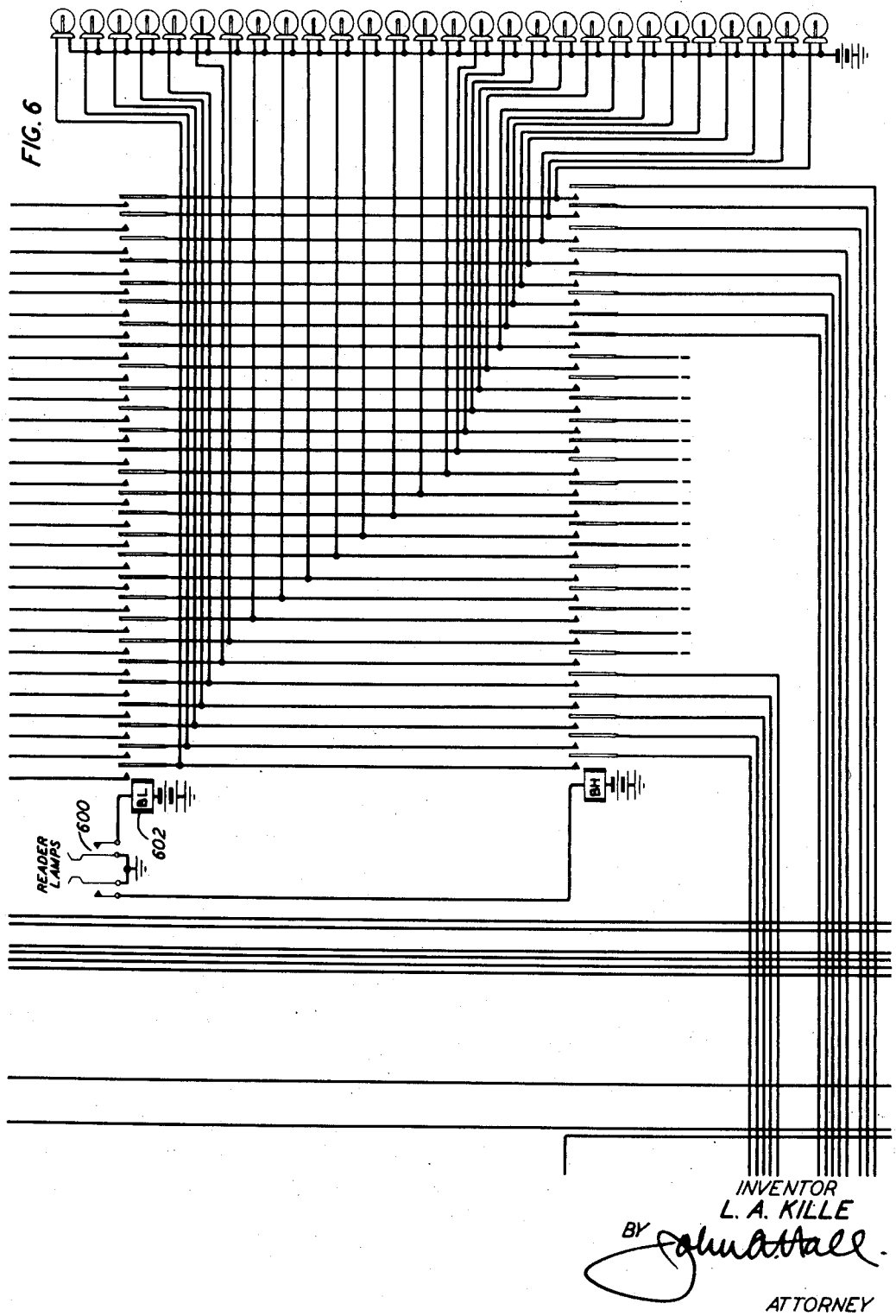
Fig. 6 represents the lamps which may be connected either to the B reader or the B register.
Figure 7:
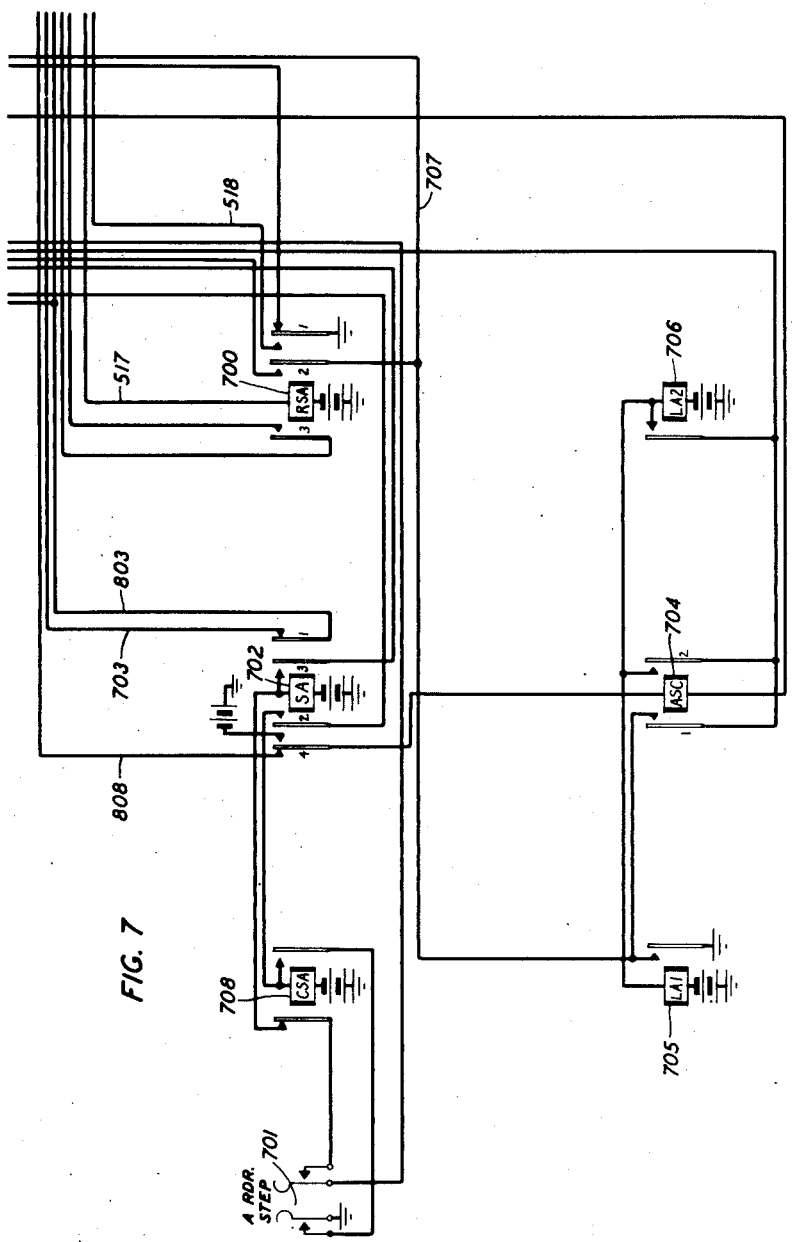
Fig. 7 represents certain control means for the A reader.
Figure 9:
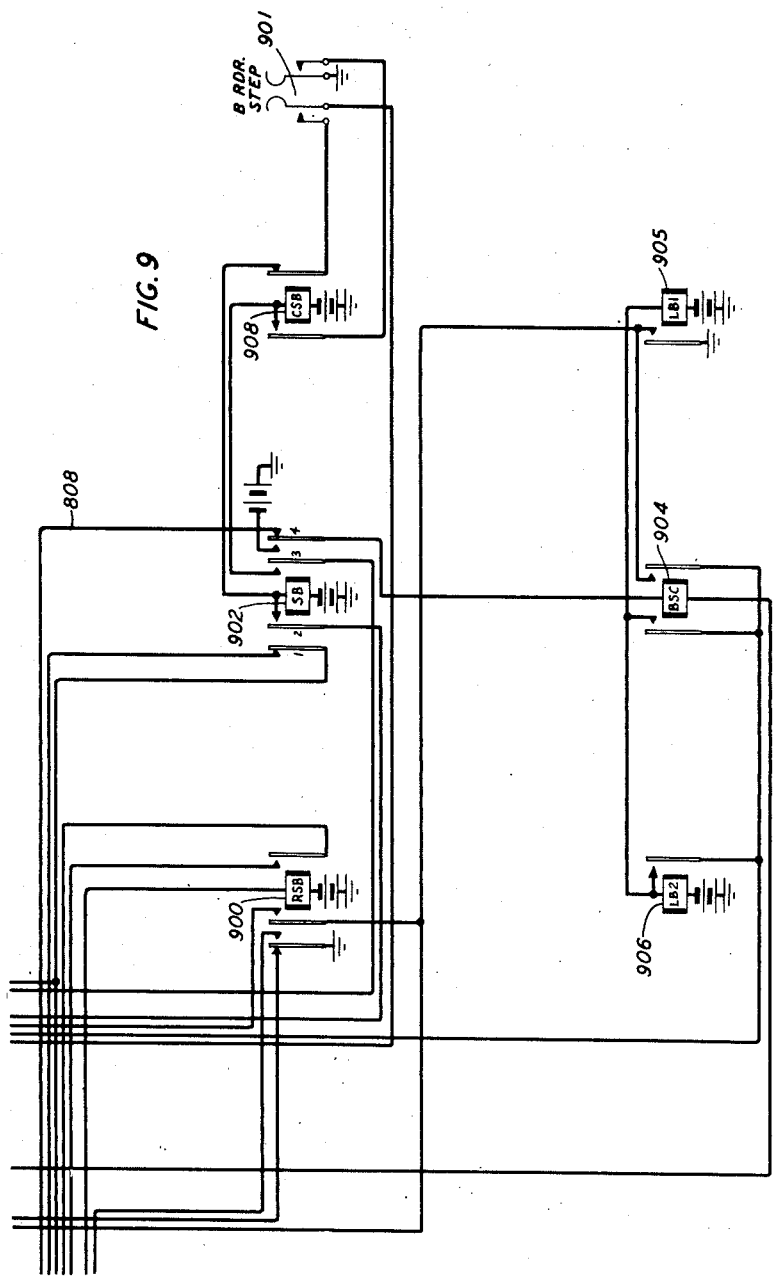
Fig. 9 represents certain control means for the B reader.

The operation of the lamp display key to the reader lamp position operates the AL cut-in relay 492 whereupon the lamps shown in Fig. 4 are connected to the reading contacts. Similarly, the operation of the key 600 will operate the BL cut-in relay 602 to connect the B display lamps to the B reader reading contacts. After determining which reader is still reading splice pattern the A reader step key 701 or the B reader step key 901 may be operated to step the associated reader off of the splice pattern and onto the first subsequent matching entry. If it so happens that both readers encounter an identical number of splice pattern lines this halt due to mismatch at the end of the splice pattern will not occur, the comparison and stepping process will continue and the start key may then be released.

The operation of the A reader step key 701 operates the SA relay 702 from ground on the out-of-phase contact H7 of the A reader. The SA relay 702 operated (a) locks to the in-phase make contact H2 of the reader, (b) releases the ARC relay 800, (c) opens the normal control circuit for the ASC relay 704 through the register match chain, (d) connects the CSA relay 708 to the in-phase contact H1 of the reader and (e) connects battery potential to the winding of the ASC relay 704. The CSA relay 708 operates as soon as the in-phase contact H1 of the A reader makes, opening the operating circuit of the SA relay 702 and locking operated to the operated A reader step key 701. The SA relay releases when the in-phase contact H2 of the A reader opens. The ASC relay operates as soon as the late made J6 contact of the A reader is closed. The ASC relay 704 operated causes the LA1 relay 705 and the LA6 relay 707 as well as the RSA relay to operate in the manner hereinbefore described and step the A reader as previously described.

The SA relay 702, the ASC relay 704, the LA1 relay 705 and the LA2 relay 706 release as soon as the in-phase contacts of the reader open. The RSA relay 700 remains operated until the out-of-phase contact H3 of the reader opens and then releases thus assuring one step of the reader. The CSA relay 708 remains operated so long as the A reader step key 701 is held, thus preventing any further stepping of the A reader due to key operation unless this key is released and reoperated.

The release of the SA relay 702 reestablishes the normal operating circuit for the ASC relay 704 through the series match check circuit of the A and B register relays and the make contacts of the ARC and BRC relays and reestablishes the normal operating circuit for the ARC relay 800.

On the next make of the reading contacts after the release of the SA relay 702 the circuit, therefore, resumes the normal comparison operation, the A register relays operating in accordance with the line being read by the A reader. If this is now a matching line the same relays will be operated in the A register as are already operated in the B register and both the ASC relay 704 and the BSC relay 904 will operate because of the match as previously discussed, causing the resumption of the reading, comparing and stepping process.

The release of the A reader step key 701 releases the CSA relay 708. The start key 504 is then released disconnecting the fixed ground from resistance 210 and cutting in the alarm circuit as previously described. If a mismatch still results due to the existence of another line of splice pattern on the A reader tape the A reader step key 701 is released and reoperated, the start key continuing to be held operated. Repeated operation of the A reader step key 701 causes the circuit to function repeatedly as just described until all remaining lines of splice pattern have been read and the normal process of reading, comparing and stepping is resumed.

In case the remaining lines of the splice pattern are on the B reader tape in place of the A reader tape the operations necessary to clear this condition are the same as just described except that the B reader step key 901 is used and the SB relay 902, the CBS relay 908, the BRC relay 802, the LB1 relay 905, the LB2 relay 906 and the RSB relay 900 as well as the B reader shown in Fig. 3 are involved in the operation.

*Mismatch alarm*

The start key 504 is released as described above when the machine resumes the normal reading, comparing and stepping operations on matching entries immediately following splice pattern. The release of the start key disconnects one shunting ground from the resistance 210. Condenser 208 will start charging at this time since one side is connected to ground supplied by the operated ST relay 510 at its armature 7 and front contact and the other side is connected to positive potential through the resistance 211. So long as either reader is stepping, however, intermittent grounds will be connected to the positive battery side of the condenser from the make contacts of the reader step relays RSA and RSB through the resistance 210, the circuit being traced through the armature 4 and front contact of the ST relay 510, conductor 518 and in one direction through the front contact and armature 1 of the RSA relay 700. These comparatively low resistance grounds are frequent enough and of long enough duration to prevent the charging of condenser A to any appreciable voltage.

When a mismatch occurs, however, relays RSA and RSB will no longer operate and after a short interval (approximately one-quarter second) the potential across condenser A will have risen to a voltage sufficient to fire the cold cathode tube 212, this potential being connected to its control electrode through the resistance 213. During the period in which the condenser 208 is charging the potential drop caused by the resistance 211 is sufficient to hold the potential of this control electrode down but when the condenser 208 is substantially charged the charging current drops off and the potential of this control electrode increases. The firing of the main gap of tube 212 operates the SAE relay 209 which in turn operates the ALM relay 204. Relay 204 operated (a) locks to ground on the normal RLS key 500, (b) releases the motor start relay 201 and (c) connects grounds to operate the single stroke bell 214 and to light the alarm lamp 215. The release of the motor start relay 201 (a) disconnects ground from both reader stop magnets, (b) releases the motor relays of the associated power control and distributing circuits (not shown but represented by the switch 102) and (c) releases the start relay 510. The release of ST relay 510 (a) opens the operating circuits of the AC and BC cut-in relays, (b) disconnects ground from the SAE relay 209 and condenser 208, (c) shunts condenser 208 and (d) releases the SR relay 202. The disconnection of ground from the SAE relay 209 and condenser 208 releases the SAE relay and restores the tube 212 to normal. The SR relay 202 released disconnects potential from the reader step magnets. Relay SR is made slow to release in order to insure that the reader stop magnets have fully released and have blocked the stepping mechanisms before potential is removed from the stepping magnets, thus preventing a false step of the readers. To extinguish the alarm lamp the RLS key 500 is operated. The operation of the RLS key releases the alarm relay 204 which disconnects grounds from the alarm lamp and the alarm bell.

*Resuming comparison after mismatch*

If desired the comparison of the remainder of the two tapes may then be resumed by operating the motor start key 200 and operating and holding the start key 504 while the A reader step key 701 and the B reader step key 901 are used to step each reader in turn off of the mismatch line and onto the matching lines as described above. If preferred the motor start key only may be operated, the readers stepped off the mismatching lines, by means of the A reader step key and the B reader step key and the subsequent matching lines checked on the reading lamps before operating the start key 504 to resume automatic machine.

*Tape comparison of abnormal tapes—using identity check only*

In case it is necesary to check for identity two tapes into which deliberate mutilations have been incorporated (that is, tapes having other than one out of three or all three holes perforated in the A digit and other than two out of five holes perforated in the B, C, D, E and F digits), this may be done by first operating the cancel check key 503 and then proceeding as described above. The circuit then operates the same as described except that the operation of the cancel check key 503 modifies the fundamental circuit for operating the ASC relay 704 and the BSC relay 904 by short-circuiting the validity check circuit. This validity check circuit as hereinbefore described extends from conductor 807 through the checking contacts of the register relays to conductor 1100 so that by the operation of the cancel check key 503, conductor 807 is connected to conductor 1100. The resulting fundamental circuit for operating the ASC and BSC relays and thereby controlling the reader step relays (RSA relay 700 and RSB relay 900) and the reader stepping may be traced through the resistance 514, conductor 516 through the matching circuit to conductor 806, front contact and armature 7 of the BRC relay 802, conductor 807, normal contact of the single tape key 502, cancel check key 503, conductor 1100, armature 5 and front contact of the ARC relay 800 to conductor 808 leading in one direction to the winding of the ASC relay 704 and in the other direction to the winding of the BSC relay 904. The circuit then functions as described above except that the alarm will sound and both readers will be stopped only when there is lack of identity between the two tapes.

When tapes containing very few defective digits are being compared it may be advantageous to compare them with the cancel check key in the normal position and permit the alarm to be sounded as the lines containing defective digits are compared. By this means all other lines will be checked for the validity of their codes.

*Check of single normal tape*

If a single tape is to be checked for accuracy of perforations the single tape key 502 is first operated, operating the STC relay 507 and modifying the fundamental circuit for controlling the ASC relay 704 by interconnecting conductors 516 and 806, thus short-circuiting the matching check circuit but retaining the validity circuit. The fundamental circuit for operating the ASC relay 704 and thereby controlling the reader step relay 700 and the stepping of the A reader may be traced as follows. From source of battery through the resistance 514, armature 2 and back contact of the release relay 515, conductor 516, right-hand make contact of the single tape key 502, conductor 807, thence through the validity circuit to conductor 1100, armature 5 and front contact of the ARC relay 800 to conductor 808 and thence to the winding of the ASC relay 704 through a back contact of the SA relay 702.

The operation of the STC relay 507 (a) opens the circuit of the B reader stop magnet 311, (b) opens the circuit of the BC cut-in relay 315, (c) opens the circuit of the motor relay for the B reader (not shown but indicated by the switch 302), (d) disconnects ground from the back contact of armature 2 of the ULB relay 513, (e) disconnects potential from the B reader step magnet 310 and (f) opens the circuit of the BSC relay 904. The disconnection of ground from the back contact of the ULB relay 513, removes the control of this relay over the locking of the ARC relay 800 and the A register relays. The circuit then functions as previously described except that since the fundamental circuit contains only validity check which may be satisfied by the operation of the A register relays and the ARC relay 800, respectively, and since the B reader is inactivated by the operation of the STC relay 507 as just described, the A reader only is used and that reader once started will continue to read, register and step so long as the validity check circuit is satisfied. In case any digit is defective the fundamental circuit for the operation of the ASC relay 704 will not close through on that line and the reader step relay 700 will not operate and the reader will not step after a short time interval, the alarm will be sounded and the A reader stopped as previously described. The A reader may then be restarted and stepped past the line if desired by the operation of the motor start and A reader step keys as previously described.

*Stopping machine*

To stop the machine while a tape comparison or check is in progress, the RLS key 500 is operated. The operation of this key connects ground through the back contacts of register control relays ARC and BRC to potential through the RLS relay 515. If both the ARC and BRC relays are normal or if operated when both ARC relay 800 and BRS relay 802 release, the RLS relay 515 operates. Relay RLS operated opens the fundamental circuit for operating the stepping control relays ASC and BSC and locks operated under control of the operated RLS key. The opening of the fundamental circuit causes the alarm equipment to function as described and stops both readers after a short time interval except that due to the fact that the RLS key 500 is held operated the ALM relay 204 will not lock. The ALM relay 204 will, therefore, release when the ST relay 510 releases and the RLS key 500 is then released, releasing the RLS relay 515. This method of stopping the machine insures that the two readers will remain on matching lines after shut down, and the comparison process may be restarted at any time by the closing of the power switch and the operation of the motor start and start relays as previously described.

*Master release*

In case the machine has stopped due to a mismatch or due to tapes running out of the readers, some register and control relays may remain locked in operated position. In the case of restarting after a mismatch the operation of the A reader step key 701 and the B reader step key 901 will release the associated registers as hereinbefore described. This method of emptying the registers by operating the A reader step key and the B reader step key in order to restart the comparison process may also be used in case the machine fails to operate due to locked up register relays when starting a comparison. However, to eliminate current drain or long period shut-downs or if for any other reason it is desired to release all operated relays this may be done by simultaneously operating the RLS key 500 and the MRL key 505. The operation of the RLS key 500 functions as previously described to retire the alarm lamp if lighted. The simultaneous operation of the RLS and the MRL keys releases the MON relay 506 which opens various operating and locking paths to release all locked up relays.

What is claimed is:

1. Means for testing a tape operated device which is adapted to process coded items of information recorded in the form of perforations in an incoming tape by combining and otherwise charging some of said items and to produce as a result of its operation outgoing tapes having perforated therein other coded items of information comprising a prepared operator tape having therein a series of codes arranged to cause said device to operate in a characteristic manner and to produce a characteristic result, a prepared expected result tape having perforated therein a series of codes corresponding to the characteristic result which should be produced by said device under proper operation by said operator tape, a tape comparer comprising a pair of independent constant speed readers for reading codes from said expected result tape and from a tape produced by said device under control of said operator tape, a register for each said reader for registering a code read from its tape, an identity circuit controlled by said registers and a stepping circuit for causing each said reader to advance its tape one step at a time for each operation of said stepping circuit, said stepping circuit being under control of said identity circuit.

2. In a device for comparing tapes having coded items of information recorded therein and having a plurality of identical non-information code patterns preceding said information items, tape sensing mechanism and a tape feeding mechanism for each of two tapes, start means for initiating concurrent operation of said tape sensing and feeding mechanisms to cause sensing of said non-information code patterns in both tapes, arrestment means for arresting both of said tape feeding means when one of said sensing mechanisms senses a code pattern other than said non-information code patterns, means for causing resumption of operation of the tape feeding mechanism associated with the other sensing mechanism, and means responsive to sensing by the last-mentioned sensing mechanism of a code pattern identical with the one that caused operation of said arrestment means for reinitiating operation of said tape sensing and feeding mechanisms.

3. In a device for comparing tapes having coded items of information recorded thereon, a tape sensing mechanism and a tape stepping mechanism for each of two tapes to be compared, a driving motor for the tape sensing and tape stepping mechanism of each tape, a register associated with each tape sensing mechanism, an identity checking circuit for comparing coded items registered in the two tapes, and means subjecting said tape stepping mechanisms to control by said identity checking circuit to cause coadjuvant registering of successive coded items of information in said tapes in their respective registers.

References Cited in the file of this patent

UNITED STATES PATENTS

| Number | Name | Date |
|---|---|---|
| 1,902,013 | Bryce | Mar. 21, 1933 |
| 2,475,315 | Doty | July 5, 1949 |